(12) United States Patent
Mikan et al.

(10) Patent No.: US 7,912,187 B1
(45) Date of Patent: Mar. 22, 2011

(54) TRANSCODING VOICE TO/FROM TEXT BASED ON LOCATION OF A COMMUNICATION DEVICE

(75) Inventors: Jeffrey Mikan, Cuming, GA (US); Anastasios Kefalas, Alpharetta, GA (US); Kenneth W. Evans, Lilburn, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1024 days.

(21) Appl. No.: 11/421,581

(22) Filed: Jun. 1, 2006

(51) Int. Cl.
*H04M 11/00* (2006.01)
*H04L 29/08* (2006.01)
*H04W 4/00* (2009.01)

(52) U.S. Cl. ............... 379/88.14; 455/414.4; 455/432.2

(58) Field of Classification Search ............... 379/88.13; 455/404.2, 414.02, 466, 564, 432.2
See application file for complete search history.

(56) References Cited

U.S. PATENT DOCUMENTS

| | | | |
|---|---|---|---|
| 6,009,398 A | 12/1999 | Mueller et al. | |
| 2001/0049275 A1 | 12/2001 | Pierry et al. | |
| 2002/0034956 A1* | 3/2002 | Mekuria | 455/466 |
| 2002/0038384 A1 | 3/2002 | Khan et al. | |
| 2002/0174147 A1 | 11/2002 | Wang et al. | |
| 2003/0140088 A1 | 7/2003 | Robinson et al. | |
| 2003/0169151 A1 | 9/2003 | Ebling et al. | |
| 2004/0002329 A1 | 1/2004 | Bhatia et al. | |
| 2004/0111269 A1 | 6/2004 | Koch | |
| 2005/0060365 A1 | 3/2005 | Robinson et al. | |
| 2005/0114777 A1 | 5/2005 | Szeto | |
| 2006/0193450 A1* | 8/2006 | Flynt et al. | 379/88.13 |
| 2007/0264969 A1* | 11/2007 | Frank et al. | 455/404.2 |

FOREIGN PATENT DOCUMENTS

GB 2396779 6/2004

OTHER PUBLICATIONS

Wilde et al., "E-112 Issues and Answers," www.trueposition.com/e-112.php., 2004.

* cited by examiner

*Primary Examiner* — Fan Tsang
*Assistant Examiner* — Solomon Bezuayehu
(74) *Attorney, Agent, or Firm* — Parks IP Law LLC; Mickki D. Murray, Esq.

(57) ABSTRACT

A device, method, and system for routing communications to an output of a communications device, such as a mobile telephone, based on the format of an incoming communication and an output mode of the communications device is disclosed. An incoming speech communication can be delivered to a speaker output or forwarded to a format converter to create a text communication that can be delivered to a display output. An incoming text communication can be delivered to a display output or forwarded to a format converter to create a speech communication for delivery to a speaker output. The output mode of the communication device can be set according to device settings, application settings, or location of the device, or a combination thereof. The invention provides new delivery options for communications which can be more appropriate for a location or current use of the communication device than those previously available.

16 Claims, 4 Drawing Sheets

TRANSCODING VOICE TO/FROM TEXT BASED ON LOCATION OF A COMMUNICATION DEVICE

FIELD OF THE INVENTION

The present invention generally relates to the field of telecommunications. More particularly, the invention relates to a wireless communication system that alters device output modes based on operating parameters.

BACKGROUND

Wireless devices have a number of user controlled parameters that can be adjusted to fit user preferences for a given situation. These parameters can include, for example, ring type, ring volume, and instant messaging presence information, among a plethora of other options. Many devices allow for the creation of profiles that save a number of device settings as a group for each profile, providing a convenient way for quickly changing a number of options at one time.

Following Federal Communication Commission (FCC) mandates for enhanced 911 service throughout the United States, wireless carriers, in many circumstances now have access to location information for wireless devices connected to their respective networks, and consequently have access to the location information for the users of these devices.

Location based services are being developed that marry these two concepts so that users are not required to change individual settings or profiles manually, but are instead able to move from place to place with the device changing its parameters based on its location. This can be useful, for example, to set a more conservative ring-tone while the user is in their office of employment, and change the ring-tone to, for example, the opening riff of a rock and roll song once they leave the office.

Instant messaging services, accessible via a personal computer or other communication devices, enable users of such services to exchange messages or other information with each other in near real-time. A feature of instant messaging services is a personal list, sometimes referred to as a "buddy list," which includes identification of other users with whom a user frequently communicates via the instant messaging services. The availability status of other users on the personal list, known as an instant messaging presence of a user, includes not only "online" or "offline", but also user-controlled statuses that may indicate a location of the user, such as "gone to a movie," "on the phone," or "eating dinner." Generally, the user-controlled statuses may be changed in response to an action received by a user interface, such as receipt of a selection of an instant messaging presence via a drop-down menu presented on the display of the communication device.

Changing settings, profile, and instant messaging information based on user settings and the location of the device can provide convenience and prevent inappropriateness in many cases. However, in some cases this may lead to a user not receiving needed information in a timely manner. For example, a telephone call or voice message for the user may not be delivered to the user while the user is in a meeting where that information would be vital. This can happen, for instance, where the user's phone, either through a manual setting or a dynamic setting based on location, is placed in a silent mode where the ringer is turned off. A vibrate function can allow the user to know that there is someone calling or that a voice message has been left for the user, but due to the circumstances of the meeting, the user may not be at liberty to take the call or listen to the message.

In other instances, the user may receive, for example, a short message service (SMS) text message, but be unable to read it due to the activity in which the user is currently engaged or the user's current situation, such as driving an automobile.

Therefore, there is a need and desire for a system and method for setting a desired communication format of a wireless device that can affect output modes based on user preferences, and a need for a system and method for affecting output modes based on a location of the device.

SUMMARY OF THE INVENTION

A system according to the present invention for delivering communications to a communication device includes routing logic configured to receive communications in one format, and configured to route the communication to a communication device output or to a format converter based on routing parameters. The system can route text communications to a display output or to a format converter for conversion to a speech format. The system can route speech communications to a speaker output of the communication device or to a format converter for conversion to a text format.

Routing parameters can include, but are not limited to, a location of the device, an application setting, and a device setting. An application setting and a device setting can be based on a location of the device. An application setting can be an instant messaging application setting. An instant messaging application setting can be an instant messaging presence.

In some embodiments, the invented system can include a location based services server configured to determine a location of the communication device and to provide the location to the routing logic, where the routing logic is configured to route a communication based on the location.

In some embodiments, the invented system can also include a messaging server configured to determine an instant messaging presence of a user of the communication device and to provide the instant messaging presence to the routing logic, where the routing logic is configured to route a communications based on the instant messaging presence.

An invented method according to the present invention can comprise determining a format of a communication intended for the communication device, determining an output mode of the communication device, routing the communication to a particular output of the communication device if the format is a corresponding format, routing the communication to a format converter if the communication is not in a corresponding format, converting the communication to the corresponding format, and sending the converted communication to the output of the communication device.

The output mode can be set by, for example, a device setting, an application setting, and/or a location of the device. An application setting or a device setting can be based on a location of the device. An application setting can be an instant messaging application setting. An instant messaging application setting can be an instant messaging presence setting.

A device according to the present invention includes a processor, speaker and display outputs, and computer readable memory. The computer readable memory can include routing logic for directing the processor to route communications in one format to a corresponding device output or to a format converter for conversion to an appropriate format. The decision can be based on one or more routing parameters.

Routing parameters can include, but are not limited to, a location of the device, an application setting, and a device setting. An application setting and a device setting can be based on a location of the device. An application setting can be an instant messaging application setting. An instant messaging application setting can be an instant messaging presence.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
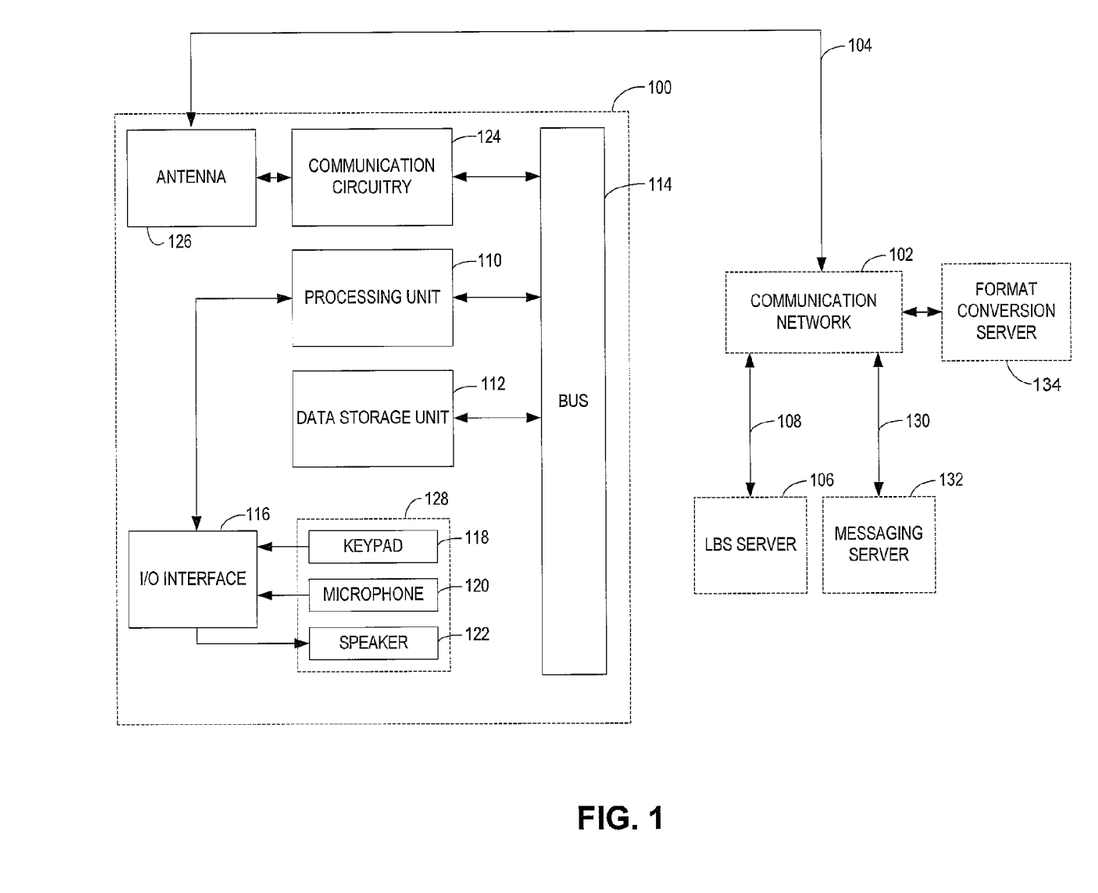
FIG. 1 is a block diagram representation of an exemplary system in accordance with an embodiment of the present invention.

FIG. 1 is an overall system diagram illustrating the exemplary system in accordance with an embodiment of the present invention. A communication device 100 communicates with a telecommunications network 102 to place and receive voice calls, short message service (SMS) messages, and instant messenger messages through an instant messenger system, in addition to any other communications, via a bi-directional communications link 104. A location based services (LBS) server 106 can also communicate with the communication device 100 through the telecommunications network 102 via a bi-directional communications link 108. A messaging server 132 can also be coupled to the telecommunications network 102 via a bi-directional communications link 130.

The communication device 100 can be any device capable of receiving and transmitting data. The communication device 100 contains a processing unit 110, which can be communicatively coupled to other components of the communication device 100 via a system bus 114.

Figure 2:
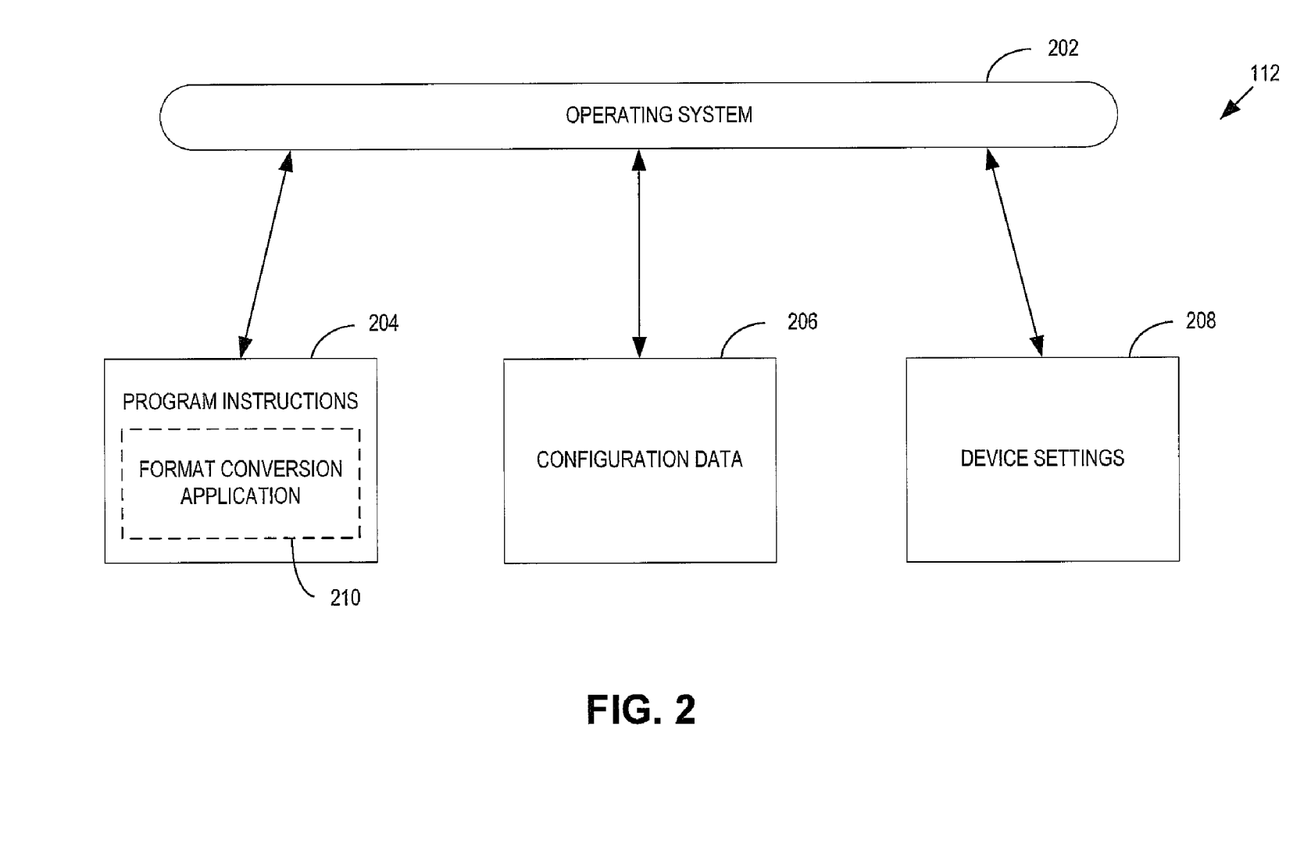
FIG. 2 is a block diagram illustrating a data storage unit used by a communication device.

The communication device 100 contains a data storage unit 112, which is discussed in greater detail in FIG. 2. Data storage unit 112 can be any type of memory, including but not limited to RAM, EPROM, or EEPROM memory, and can store data in either volatile or non-volatile memory. The processing unit 110 and the data storage unit 112 can communicate via the system bus 114. Alternatively, the processing unit 110 and the data storage unit 112 can be included on the same microprocessing chip.

The communication device 100 also includes an I/O interface 116, which can reside on the same microprocessing chip as the processing unit 110. However, the I/O interface 116 can also reside on an external unit. The I/O interface 116 can connect the processing unit 110 to a user interface 128. In the case of a wireless device such as a cellular telephone, the user interface 128 can include a keypad input 118, a microphone input 120, and a speaker output 122. The I/O interface 116 can include an analog-to-digital converter for converting an analog microphone signal to a digital microphone signal for use by the processing unit 110. The I/O interface 116 can also include a digital-to-analog converter to convert digital information from the processing unit 110 to the speaker output 122, such as voice data.

The processing unit 110 transmits and receives digital signals that are to be communicated outside the communication device 100 via communication circuitry 124 connected to an antenna 126. The antenna 126 communicates signals through airwaves to the telecommunications network 102 via a bi-directional communication link 104 when such a link is established, for example, when a call is placed to or from the communication device 100.

In some embodiments, the communication device 100 can include a positioning receiver and antenna (not shown) for receiving positioning signals from positioning satellites to determine a location of the device.

The telecommunications network 102 receives signals, from the communication device 100 via antenna 126. The telecommunications network 102 includes various components required to enable communication between two or more communication devices, including wired connections, wireless connections, switches, and other devices for establishing communication in the network.

The telecommunications network 102 can be communicatively coupled to a location based services (LBS) server 106, which can be any computer system with a capability to determine the location of a communication device. The telecommunications network 102 can also be coupled to the messaging server 132 via a bi-directional communications link 130. The messaging server 132 can be any computer system communicating with the telecommunications network to provide messaging capabilities to communication devices on the telecommunications network 102, including a server of a wireless service provider. The telecommunications network can additionally be connected to a format conversion server 134 configured to convert a communication from a first format to a second format and/or from a second format to a first format.

The LBS server 106 can be a server capable of determining the location of the communication device 100. The LBS server 106 communicates location information to the telecommunications network 102 via a bi-directional communications link 108. The location information can subsequently be transmitted to the communication device 100 via the bi-directional communications link 104. The messaging server 132 can be used for providing messaging capabilities to the communication device 100 through an interaction with the telecommunications network 102, including but not limited to, an instant messaging client or server for a wireless services carrier. The messaging server 132 communicates information, such as instant messaging presence or other information pertaining to a user profile, to the telecommunications network 102 via bi-directional communications link 130.

Location of the communication device 100 can be determined in a number of ways. The location of the device can be determined using triangulation techniques. Triangulation methods comprise measuring signal characteristics to determine a location of the device. Time of arrival of signals from network base stations to the device can be used as well as time or arrival of signals from the device to network base stations. In addition, other parameters of the signal can be used, including, but not limited to, signal strength, signal phase, and which of a plurality of directional antennas of a base station is receiving the strongest signal from the device. Triangulation techniques are also employed in global positioning system (GPS) based location techniques. In the case of GPS, signal parameters from a plurality of orbiting satellites are measured to determine a location of the device.

Two standards for measuring mobile device location have emerged in the United States in response to the FCC mandate for location information on mobile devices to deliver enhanced 911 services. These are uplink difference time of arrival (U-TDOA) and assisted GPS (A-GPS). The global services mobile (GSM) wireless carriers are implementing U-TDOA solutions, while CDMA and providers are using A-GPS. The present invention can be implemented in these and other mobile device location determining schemes.

In addition to the robust techniques listed above, simpler techniques can be used to determine a relative location between the mobile device and a person, place, or object. For example, a short-range radio beacon, such as a Bluetooth radio can be used to communicate with Bluetooth capable devices. By merely establishing communication between the two Bluetooth radios, the mobile device can be made aware that it is close enough to the external Bluetooth radio to be within its communication radius. Another example of this location technique is the use of a car cradle, home charger, or any device that physically interfaces with the mobile communication device 100. When the mobile device 100 is interfaced with, for example, a car charger, the mobile device 100 can be made aware that it is in a car. The present invention can be implemented using these location determining schemes as well.

The transfer of location information between system elements can be the result of various processes depending on the capabilities and functionality of the communication device 100. These processes include, for example, a query of an on board GPS receiver of the communication device 100, a request by the communication device 100 for location information from the LBS server 106, or a "push" of location information to the communication device 100 by the LBS server 106 over the telecommunications network 102. The location information can take any form sufficient to identify the location of the user, such as, x and y coordinate data, or latitude/longitude data. In some embodiments, coordinate data (or latitude/longitude) is not transferred to the communication device 100, but is instead used by an external (external from the communication device 100) network element to determine a location of the device 100. For example, the LBS server 106 can use coordinate location data for the device 100 to determine that the device is "at home" by using a lookup table or other cross-referencing method, and provide this information to the messaging server 132 to update an instant messaging presence of the user/device 100.

The system elements used to determine the location of the communication device depend on the method used. Some elements may not be required for some methods. For example, the Bluetooth related method and physical interfacing methods described above can be implemented without an LBS server 106. In addition, in some embodiments location determination using GPS methods can be implemented without an LBS server 106.

Furthermore, some embodiments of the present invention do not require a location determination, instead relying on various device settings, such as device parameter settings, profile settings, or application settings such as instant messaging presence settings.

FIG. 2 is a block diagram representation of the data storage unit 112 of the communication device 100. The data storage unit 112 comprises an operating system 202, which contains instructions for operating the communication device 100. In addition to any other instructions, a program instructions unit 204 includes instructions, which when executed by the processing unit 110, perform methods of the present invention. The program instructions unit can include a format conversion application for converting a communication from a first format into a second format and/or from a second format into a first format. Alternatively, format conversion operations can be performed by a network element external to the communication device 100. A configuration data unit 206 can be included in the data storage unit 112 that contains various configuration information data.

The data storage unit 112 can also contain a device settings unit 208. The device settings unit 208 can contain various parameters indicating the settings of the communication device 100. These parameters can include a value for indicating an instant messaging presence associated with the communication device 100. Another parameter can be a communication format type. A communication format type can be associated with an instant messaging presence. Other device settings that can be stored in the device settings unit 208 include, but are not limited to, ring type, touch tone type, or appearance of the user interface 128. The data storage unit 112 can optionally include a format conversion application 210.

Figure 3:
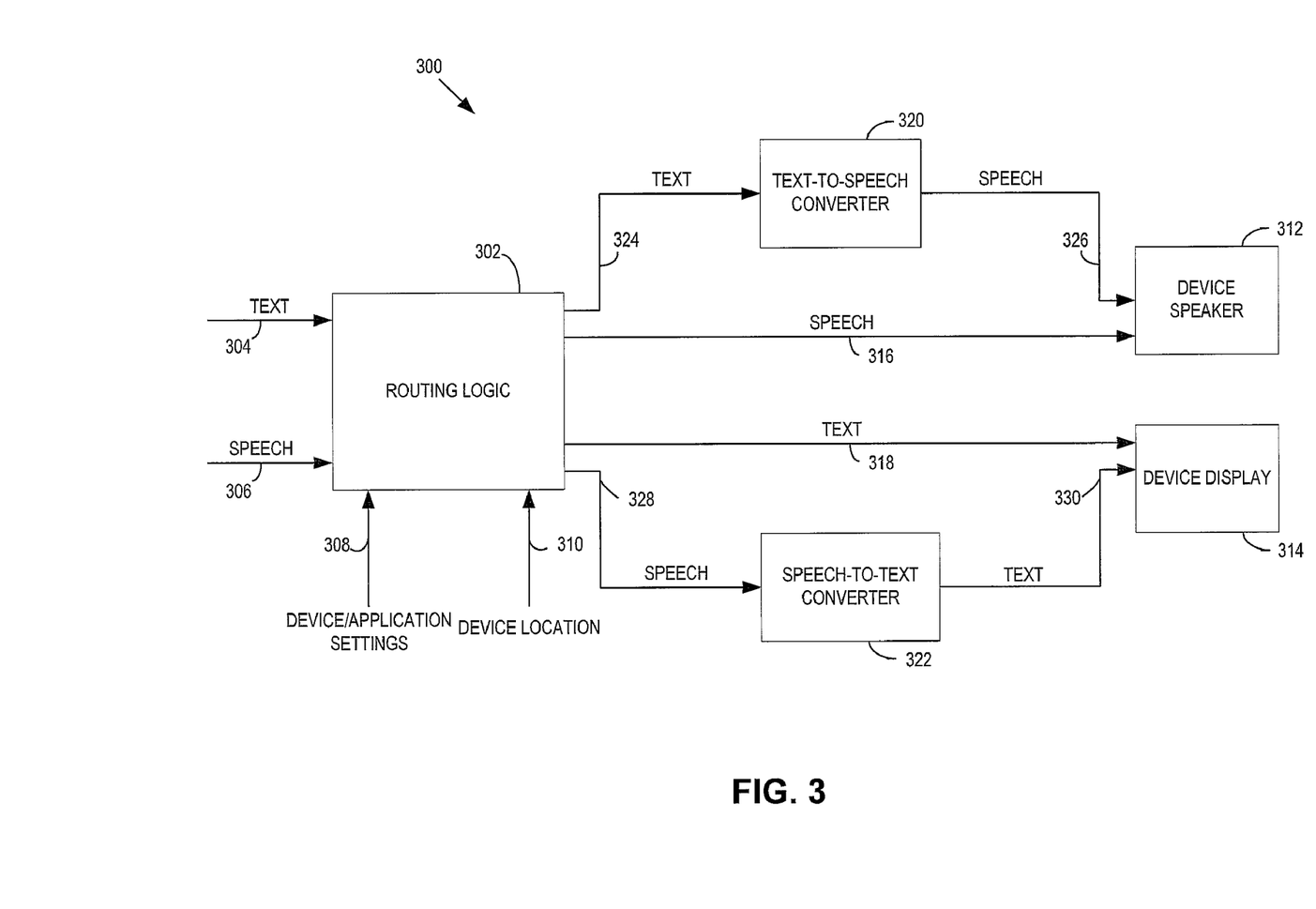
FIG. 3 is a block diagram representation of an exemplary system in accordance with an alternative embodiment of the present invention.

FIG. 3 is a block diagram illustrating systems and methods of routing communications according to the present invention. Routing logic 302 has inputs for text communications 304, speech communications 306, device/application settings 308, and device location 310. It should be understood that the elements of FIG. 3 can be implemented in hardware or software of the communication device 100 or in one or more network elements (external to the communication device), or a combination thereof. The routing logic 302 can reside in the communication device 100 or on a network element external to the device or a combination thereof. The routing logic can accept text or speech communications intended for the communication device 100 and route them based on the device/application settings 308 and/or the device location 310.

The routing logic 302 can route a text communication 324 to the text-to-speech converter 320 or route a text communication 318 directly to the device display 314 of the communication device 100. The text-to-speech converter can be included in the format conversion server 134 of FIG. 1 and/or the format conversion application 210 of FIG. 2. Routing logic 302 can route a speech communication 328 to the speech-to-text converter 322 or route a speech communication 316 directly to the device speaker 312 of the communication device 100. The speech-to-text converter can be included in the format conversion server 134 of FIG. 1 and/or the format conversion application 210 of FIG. 2.

Text communications 324 routed to the text-to-speech converter 320 are converted to speech communications 326 and forwarded to the device speaker 312. The text-to-speech converter can be a voice synthesizer that accepts text and outputs speech corresponding to the text communication being converted. The text-to-speech converter can be implemented in hardware, software, or a combination thereof. The text-to-speech converter can be implemented in the communication device 100, in external network elements, or in a combination thereof.

Speech communications 328 routed to the speech-to-text converter 322 are converted to text communications 330 and forwarded to the device display 314. The speech-to-text converter can be voice recognition hardware or software that is capable of accepting human speech and outputting text that corresponds to the inputted speech. The speech-to-text converter can be implemented in hardware, software, or a combination thereof. The speech-to-text converter can be implemented in the communication device 100, in external network elements, or in a combination thereof.

It should be understood that the pathways depicted in FIG. 3 can be wired interfaces or wireless interfaces.

The routing logic 302 can operate to route communication intended for the communication device 100 according to user preferences/device settings, application settings, device location, or any combination thereof. A communication device 100 user, for example, can, through a device setting, indicate that text communications, such as SMS messages, are to be converted into speech communications before delivery to the communication device 100. The device setting can be an individual setting or part of a device profile. This can be desirable where the user will be in a situation where the user cannot or should not focus their eyes on the display of a communication device to read a text communication. An example of such a situation is where the user is driving an automobile. Also, a user might be in a situation where both hands will be in use. A user might be working on a ladder, for example, where the user is in earshot of the device but unable to reach it. In such cases the communication device 100, for example, can be set to play text converted to speech over a speaker of the communication device. Bright light conditions such as a sunny day on a lake might cause difficulty in reading a device display, in which case a text-to-speech conversion can be desirable. Many other uses for such a feature will be apparent to one of ordinary skill in the art.

Likewise, a user can, through a device setting, indicate that speech communications should be converted into text communications before output to the communication device 100. This can be desirable in situations where the receipt of a speech communication would be impossible (for example, at a loud concert), socially improper (for example, in a church, movie theater, or business meeting), or the user is just not interested in taking calls at the time.

In addition to a user indicating communication receipt preferences through device settings, application settings of device applications can be used to determine how communications should be routed to the communication device. A user may be, for example, listening to an audio player built into the device. The settings of the audio player application can instruct the routing logic 302 to route speech communications to the speech-to-text converter so as not to disturb the user.

Another example is settings of an instant messenger application having an interface on the communication device 100. Such applications have user presence information that can be set based on a number of factors including, but not limited to, manual user settings, current use of the device, and settings of an associated messenger application on the device itself or on another device (such as the user's personal computer). Further examples of instant messenger presence settings can be found in the related applications mentioned above which have been incorporated by reference. The instant messenger application's presence information can be used to determine how communications should be routed to the communication device 100. For example, if the presence information indicates that the user is in a meeting, speech communications can be routed to the speech-to-text converter for delivery to the communication device. A presence setting of "in the car" can cause the routing logic 302 to route text communication to the text-to-speech converter for delivery to the communication device.

The routing logic 302 can also route communications based on a device location. The device location can be determined using one or any combination of the methods described above. For example, upon the communication device arriving at the user's business office, the routing logic 302 can be configured to route speech communications to the speech-to-text converter. If the location of the device is rapidly changing (or has a threshold velocity, for example) the routing logic can be configured to presume that the user is in an automobile and route text communications to the text-to-speech converter (this may be undesirable if the user is a passenger in a car or is on a train, in which case the user can disable this feature). Bringing the device within the communication radius of a Bluetooth radio located at a movie theater, for example, can cause the routing logic 302 to forward speech communications to the speech-to-text converter 320.

It should be understood that the device and device applications can be configured to accept a device location instead of, or in addition to the device location being provided directly to the routing logic 302. For example, the routing logic can route communications based on the settings of an instant messenger application as mentioned above. The instant messenger application setting can be based on a location of the device. It should be understood that text communications include text messages of an instant messenger application and speech communications include any speech communications or voice chat data of an instant messenger application.

The routing logic can also route communications based on the settings of the communication device. The communication device 100 settings can be based on a location of the device.

Figure 4:
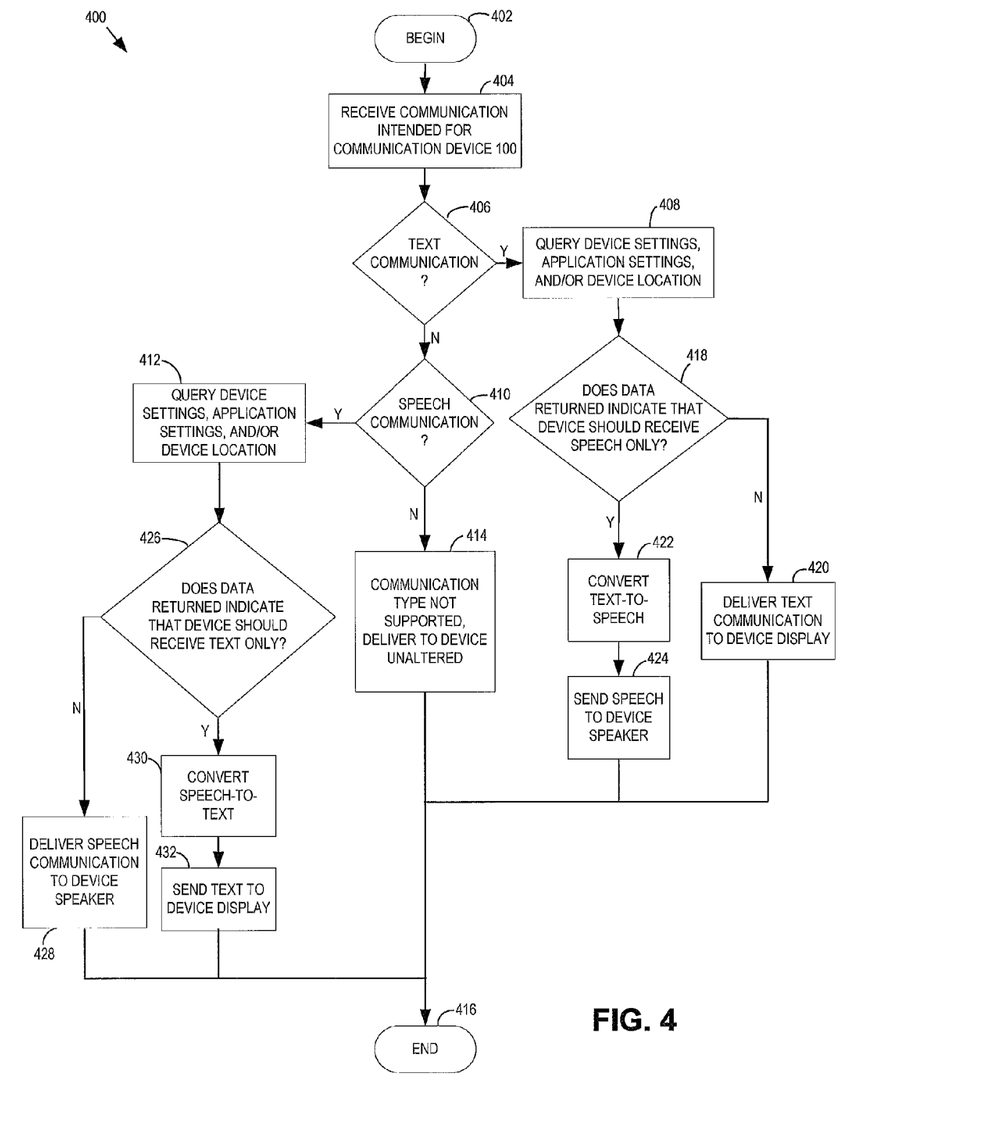
FIG. 4 is flow diagram illustrating a method of operation for an embodiment of the present invention.

FIG. 4 shows a flowchart of a method 400 according to the present invention. This method can be implemented in hardware, software or a combination thereof and can be implemented in the communication device 100, network elements external to the communication device 100, or a combination thereof. The method begins at 402 and proceeds to 404 where a communication intended for the communication device 100 is received. At 406 the communication is checked to determine if the communication comprises a text format. If the communication comprises a text format, operation proceeds to 408. If the communication does not comprise a text format, operation proceeds to 410 where the communication is checked to determine if the communication comprises a speech format. If the communication comprises a speech format, operation continues to 412. If the communication does not comprise a speech format, operation proceeds to 414. If 414 is reached, the communication does not comprise formats supported by the method and is delivered to the device unaltered, and the method ends at 416. It should be understood that the method of FIG. 4 is exemplary and additional formats can be added to the present invention.

Returning to 408, a query of device settings, application settings, and/or device location is performed. At 418, the results of the query are checked to determine if the state of the device settings, application settings, and/or device location indicates that the device should receive speech only. This determination can be accomplished through the use of a lookup table, or any other logical method for mapping or associating a set of conditions to/with an outcome. Examples of possible logical arrangements are given below in Tables 1 through 4. If the data does not indicate that the device should receive speech only, operation continues to 420 where the text communication is delivered to the communication device display is its text format. The method then ends at 416. If device should receive text only, the text message is converted into a speech format at 422. The speech formatted message is then delivered to the communication device speaker at 424. The method ends at 416.

Returning to 412, a query of device settings, application settings, and/or device location is performed. At 426, the results of the query are checked to determine if the state of the device settings, application settings, and/or device location indicates that the device should receive text only. This determination can be accomplished through the use of a lookup table, or any other logical method for mapping or associating a set of conditions to/with an outcome. Examples of possible logical arrangements are given below in Tables 1 through 4. If the data does not indicate that the device should receive text only, operation continues to 428 where the speech communication is delivered to the communication device speaker in its speech format. The method then ends at 416. If device should receive text only, the speech message is converted into a text format at 430. The text formatted message is then delivered to the communication device display at 432. The method ends at 416.

It should be understood that the method 400 can be implemented as a loop such that the method continuously waits for incoming messages, performs conversion operations as needed, and again waits for incoming messages.

Table 1 shows a set of relationships where a communication mode of a communication device is based on device settings.

TABLE 1

| Device Setting | Communication Mode |
|---|---|
| Text Only | Text Only |
| Speech Only | Speech Only |
| Silent | Text Only |
| Soft | Normal |
| Loud | Normal |

Five device settings are shown in Table 1. Table 1 is exemplary and many more device settings can be used to determine a communication mode of the device. A "text only" or "speech only" device setting can be used to place the device in a corresponding communication mode. Profile settings for "silent", "loud", and "soft" can be mapped to communication modes according to user preferences. User preferences can be entered through a user interface of the communication device as is known in the art for setting other profile features, for example, the interface used for setting a ring tone corresponding to a given profile. In the example of Table 1, the device is set to receive text only when the device is in a "silent" profile. In the "soft" and "loud" profile, communications can be delivered as normal. That is, text delivered as text, and speech delivered as speech.

Table 2 shows instant messaging (IM) presence indicators mapped to device communication modes.

TABLE 2

| IM Presence | Communication Mode |
|---|---|
| At Work | Normal |
| In Meeting | Text Only |
| Do Not Disturb | Normal |
| Away | Normal |
| In Car | Speech Only |
| Available | Normal |
| Busy | Normal |
| Available for Speech Only | Speech Only |
| Available for Text Only | Text Only |

Table 3 shows device locations mapped to device communication modes.

TABLE 3

| Location | Communication Mode |
|---|---|
| Not Stored | Normal |
| At Home | Normal |
| Connected to Car Charger | Speech Only |
| At Church | Text Only |
| At Office | Normal |

Locations such as "At Home", at "Church", and "At Office" can be configured through user preferences. For example, when the device is located at the user's home, the user can use an interface to define the current location as "At Home". The user can provide a radius from the current location for which the "At Home" setting will apply, or this can be a fixed value for each location setting determined by the service provider. The "Not Stored" location refers to a location that the device does not recognize. For example, the device is located in an area that the user has not defined or the location of the device cannot be determined.

Table 4 shows a set of relationships between various device settings, instant messaging presence settings, device locations, and device communication modes.

TABLE 4

| Device Setting | IM Presence | Location | Communication Mode |
|---|---|---|---|
| Text Only | — | — | Text Only |
| Speech Only | — | — | Speech Only |
| Normal | In Car | — | Speech Only |
| Normal | In Meeting | — | Text Only |
| Normal | In Theater | — | Text Only |
| Normal | Available | Not Stored | Normal |
| Normal | Busy | Not Stored | Normal |
| Normal | Available | At Office | Text Only |
| Normal | Available | Connected to Car Charger | Speech Only |
| Normal | Available | At Church | Text Only |

In the set of relationships shown in Table 4, priority is given to the device settings, then to the IM presence settings, and then to the device location in determining the communication mode of the device. The device settings of "Text Only" and "Speech Only" cause the communication mode to be set correspondingly. The "-" in the other columns indicates a logical "don't care". In the remaining table entries, the device setting is set to "Normal".

Where the IM presence is set to "In Car" the location setting is ignored, and the communication mode is set to "Speech Only".

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

The invention claimed is:

1. A system for delivering communications to a communication device having display and speaker outputs, the system comprising:
routing logic configured to route an incoming communication in a first format intended for the communication device; and a first format converter for converting the communication in the first format into a second format;

wherein, the routing logic is configured to route the communication to the first format converter or to a device output based on at least one routing parameter selected from a group of routing parameters consisting of a location of the communication device and an instant messaging presence established for a user of the communication device.

2. The system of claim 1 wherein,
the first format is a text format,
the second format is a speech format,
the first format converter sends its output to the speaker output of the communication device, and
the routing logic being configured to route the communication to the first format converter or to the display output of the communication device based on the at least one routing parameter.

3. The system of claim 1 wherein, the instant messaging presence is based on the location of the communications device.

4. The system of claim 1 wherein,
the first format is a speech format,
the second format is a text format,
the first format converter sends its output to the display output of the communication device, and
the routing logic being configured to route the communication to the first format converter or to the speaker output of the communication device based on the at least one routing parameter.

5. The system of claim 1 further comprising a second format converter for converting a communication in the second format into the first format.

6. The system of claim 5 wherein,
the first format is a text format,
the second format is a speech format,
the first format converter sends its output to the speaker output of the communication device,
the second format converter sends its output to the display output of the communication device, and
the routing logic being configured to route the communication to the first format converter, the second format converter, the speaker display output of the communication device, or the display output of the communication device based on the at least one routing parameter.

7. The system of claim 1 further comprising:
a location based services server configured to determine the location of the communication device and to provide the location to the routing logic, the routing logic being configured to route communications based on the location determined by the location based services server.

8. The system of claim 1 further comprising:
a messaging server configured to determine the instant messaging presence of a user of the communication device and to provide the instant messaging presence to the routing logic, the routing logic being configured to route communications based on the instant messaging presence.

9. A method for delivering communications to a communication device having display and speaker outputs, the method comprising:
routing logic receiving a communication intended for the communication device;
the routing logic routing the communication, in a first format, to a format converter or to a device output based on at least one routing parameter selected from a group of routing parameters consisting of a location of the communication device and an instant messaging presence established for a user of the communication device;
the format converter converting the communication in the first format into a second format if the routing logic routes the communication to the format converter based on the at least one routing parameter; and
the device output outputting the communication in the first format if the routing logic routes the communication to the device output based on the at least one routing parameter.

10. The method of claim 9 wherein:
the format converter converting the communication in the first format into the second format comprises a speech-to-text converter converting the communication in a speech format into a text format; and
the device output outputting the communication in the first format comprises a speaker output outputting the communication in the speech format.

11. The method of claim 9 wherein:
the format converter converting the communication in the first format into the second format comprises a text-to-speech converter converting the communication in a text format into a speech format; and
the device output outputting the communication in the first format comprises a display output outputting the communication in the text format.

12. A communication device for receiving a communication, the communication device comprising:
a processor;
a speaker output;
a display output; and
a computer readable memory comprising:
routing logic for directing the processor to route a communication in a first format to one of a first device output and a first format converter for converting the communication to a second format for delivery to a second device output, the routing logic directing the processor to route the communication based on at least one routing parameter selected from a group of routing parameters consisting of a location of the communication device and an instant messaging presence.

13. The device of claim 12 wherein, the routing logic further directs the processor to route a communication in a second format to one of a second device output and a second format converter for converting the communication to the first format for delivery to the first device output, the routing logic directing the processor to route the communication based on the at least one routing parameter.

14. The device of claim 13 wherein,
the first format is a text format,
the second format is a speech format,
the first device output is the display output,
the second device output is the speaker output,
the first format converter sends its output to the speaker output of the communication device, and
the routing logic directs the processor to route the communication to the first format converter or to the display output of the communication device based on the at least one routing parameter.

15. The device of claim 12 wherein,
the first format is a speech format,
the second format is a text format,
the first device output is the speaker output,
the second device output is the display output,
the first format converter sends its output to the display output of the communication device, and the routing logic directs the processor to route the communication to the first format converter or to the speaker output of the communication device based on the at least one routing parameter.

16. The device of claim 13 wherein, the first format is a text format, the second format is a speech format, the first device output is the display output, the second device output is the speaker output, the first format converter sends its output to the speaker output of the communication device, if the communication is in the first format, the routing logic directs the processor to route the communication to the first format converter or to the display output of the communication device based on the at least one routing parameter, and if the communication is in the second format, the routing logic directs processor to route the communication to the second format converter or to the speaker output of the communication device based on the at least one routing parameter.

* * * * *